(12) United States Patent
Hayashi et al.

(10) Patent No.: US 9,137,435 B2
(45) Date of Patent: Sep. 15, 2015

(54) FOCUS DETECTION APPARATUS

(71) Applicant: CANON KABUSHIKI KAISHA, Tokyo (JP)

(72) Inventors: Hidetoshi Hayashi, Fujisawa (JP); Tatsuhiko Yamazaki, Zama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/018,535

(22) Filed: Sep. 5, 2013

(65) Prior Publication Data

US 2014/0078377 A1 Mar. 20, 2014

(30) Foreign Application Priority Data

Sep. 20, 2012 (JP) ................................ 2012-207528

(51) Int. Cl.
*H04N 5/232* (2006.01)
*G02B 7/34* (2006.01)
*H04N 5/369* (2011.01)

(52) U.S. Cl.
CPC ............ *H04N 5/23212* (2013.01); *G02B 7/346* (2013.01); *H04N 5/3696* (2013.01)

(58) Field of Classification Search
CPC ... H04N 5/23212; H04N 5/3696; G02B 7/28; G02B 7/34; G02B 7/346
USPC ......................................... 348/345, 349, 350
See application file for complete search history.

(56) References Cited

U.S. PATENT DOCUMENTS

| 7,102,675 B1 * | 9/2006 | Tokunaga ..................... 348/297 |
| 8,538,251 B2 | 9/2013 | Yamamoto et al. |
| 2012/0057057 A1 * | 3/2012 | Amano ......................... 348/294 |
| 2013/0202281 A1 | 8/2013 | Yamazaki et al. |

FOREIGN PATENT DOCUMENTS

JP 11-150686 A 6/1999

* cited by examiner

*Primary Examiner* — Sinh Tran
*Assistant Examiner* — Mark Monk
(74) *Attorney, Agent, or Firm* — Fitzpatrick, Cella, Harper & Scinto

(57) ABSTRACT

A focus detection apparatus for performing phase difference detection type focus detection includes sensor units each configured to generate a signal used for detecting a phase difference, a setting unit configured to set one or more sensor units as determination targets, a determination unit configured to sequentially select a sensor unit from the determination targets, and repeatedly determine whether a signal generated by the selected sensor unit satisfies a termination condition of having a peak value greater than a threshold, and a detection unit configured to perform focus detection using the signal that satisfies the termination condition. The apparatus operates in a first mode and then shift to a second mode. The setting unit includes, in the determination targets in the second mode, a sensor unit that is not included in the determination targets in the first mode.

13 Claims, 13 Drawing Sheets

FOCUS DETECTION APPARATUS

BACKGROUND OF THE INVENTION

1. Field of the Invention

The present disclosure relates to focus detection apparatuses.

2. Description of the Related Art

Autofocus cameras that change the focus of an imaging lens and automatically bring the imaging lens into focus are in widespread use. Some cameras are provided with a focus detection apparatus that uses pixel signals from a sensor-array block arranged with respect to a focus detection area to detect a phase difference between two images. If the pixel signals from the sensor-array block are low, the signal-to-noise ratio is reduced and thus focus detection cannot be performed with high accuracy. Accordingly, a comparator is used to determine whether or not a pixel signal that increases with charge accumulation exceeds a threshold (hereinafter, this determination is referred to as termination determination), and if it is determined that the pixel signal exceeds the threshold, the charge accumulation is terminated, and focus detection is performed using the pixel signal at that time. There are some phase difference detection type focus detection apparatuses in which sensor-array blocks are arranged with respect to a plurality of focus detection areas, and focus detection can be performed in the respective focus detection areas. Japanese Patent Laid-Open No. 11-150686 proposes a focus detection apparatus that includes a plurality of sensor-array blocks and in which one comparator for use for the termination determination is shared with the plurality of sensor-array blocks, leading to a reduction in the chip area.

SUMMARY OF THE INVENTION

In some embodiments, a focus detection apparatus for performing phase difference detection type focus detection, comprises: a plurality of sensor units each configured to generate a signal used for detecting a phase difference; a setting unit configured to set, from among the plurality of sensor units, one or more sensor units as determination targets; a determination unit configured to sequentially select a sensor unit from the sensor units serving as determination targets, and repeatedly determine whether a signal generated by the selected sensor unit satisfies a termination condition of having a peak value that is greater than a first threshold; and a detection unit configured to perform focus detection using the signal that satisfies the termination condition. The focus detection apparatus is configured to operate in a first mode and then shift to a second mode. The setting unit is configured to include, in the determination targets in the second mode, a sensor unit that is not included in the determination targets in the first mode.

In some other embodiments, a focus detection apparatus that performs phase difference detection type focus detection, comprises: a plurality of sensor units each configured to generate a signal used for detecting a phase difference; a setting unit configured to set, from among the plurality of sensor units, one or more sensor units as determination targets; a determination unit configured to sequentially select a sensor unit from the sensor units serving as determination targets, and repeatedly determine whether a signal generated by the sensor unit satisfies a termination condition of having a peak value that is greater than a first threshold; and a detection unit configured to perform focus detection using the signal that satisfies the termination condition. The focus detection apparatus is configured to operate in a first mode and then shift to a second mode. The plurality of sensor units include a first sensor unit and a second sensor unit that are assigned to the same focus detection area. If it is determined that a signal generated by the first sensor unit satisfies the termination condition in the first mode, the detection unit performs focus detection with respect to the same focus detection area with the use of the signal from the first sensor unit, without using a signal from the second sensor unit, and if it is determined that the signal generated by the first sensor unit satisfies the termination condition in the second mode, the detection unit performs focus detection with respect to the same focus detection area with the use of the signal from the first sensor unit and the signal from the second sensor unit.

Further features of the present disclosure will become apparent from the following description of exemplary embodiments (with reference to the attached drawings).

BRIEF DESCRIPTION OF THE DRAWINGS

The accompanying drawings, which are incorporated in and constitute a part of the specification, illustrate embodiments of the invention, and together with the description, serve to explain the principles of the embodiments.

DESCRIPTION OF THE EMBODIMENTS

Figure 1:
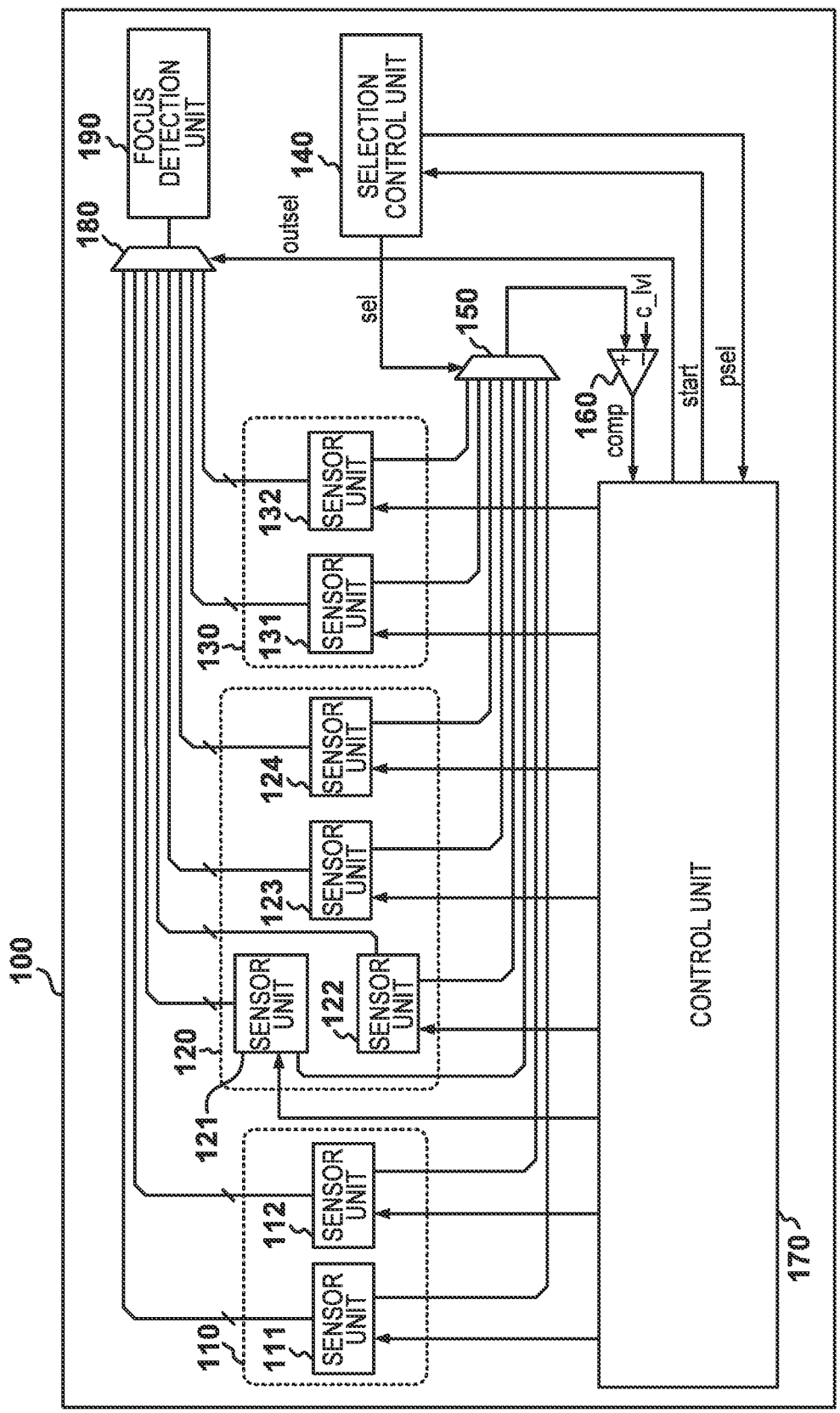
FIG. 1 is a block diagram illustrating an example of a configuration of a focus detection apparatus according to some embodiments of the present invention.

Hereinafter, embodiments of the present invention will be described with reference to the accompanied drawings. Throughout various embodiments, the same reference numerals are given to similar components, and an overlapping description thereof is omitted. Also, the embodiments may suitably be modified and combined. The following embodiments relate to a focus detection apparatus that is mounted on an image capturing device such as a camera or a video recorder. The following description deals with a focus detection apparatus that can perform focus detection with respect to a plurality of focus detection areas that correspond to respective focus detection points, but some embodiments of the present invention are applicable to a focus detection apparatus in which a plurality of sensor units are arranged with respect to a single focus detection area.

In the case where one comparator is shared with a plurality of sensor-array blocks as in Japanese Patent Laid-Open No. 11-150686, the plurality of sensor-array blocks are sequentially scanned and termination determinations are performed, so the termination determination in each sensor-array block is performed intermittently. As a result, it takes a long time from the peak pixel signal having actually exceeded a threshold until a termination determination is performed, and pixel signals in many pixels of the sensor-array blocks will exceed a dynamic range particularly when light with a high luminance is incident on the pixels. If focus detection is performed using such pixel signals, the accuracy of the focus detection deteriorates. Therefore, some aspects of the present invention provide a technology for improving the accuracy of focus detection.

An example of a configuration of a focus detection apparatus 100 according to a first embodiment is described with reference to the block diagram of FIG. 1. The focus detection apparatus 100 may include a plurality of sensor units 111, 112, 121 to 124, 131, and 132. Each sensor unit includes a plurality of pixels and generates signals depending on amounts of charges accumulated in the respective pixels, and the focus detection apparatus 100 uses these signals to perform phase difference type focus detection. The focus detection apparatus 100 performs focus detection with respect to three focus detection areas, and the plurality of sensor units are divided into a plurality of sensor groups 110, 120, and 130 for the respective focus detection areas. For example, the two sensor units 111 (first sensor unit) and 112 (second sensor unit) that are included in the sensor group 110 are arranged with respect to the same focus detection area. The same applies to other sensor groups.

The focus detection apparatus 100 may further include a selection control unit 140 and a selector 150. Each sensor unit supplies a peak value among the pixel signals generated in the plurality of pixels, as a peak signal, to the selector 150. The selection control unit 140 supplies a control signal "sel" to the selector 150 so as to control operation of the selector 150. The selector 150 selects and outputs the peak signal supplied from any one of the sensor units in accordance with the control signal "sel".

The focus detection apparatus 100 may further include a comparator 160. The peak signal from the selector 150 is supplied to a non-inverting input terminal of the comparator 160, and a reference signal is supplied to an inverting input terminal of the comparator 160. In the present embodiment, the value of the reference signal that is supplied is a fixed value threshold "c_lvl". The comparator 160 outputs a determination signal "comp" according to the result of comparison between the peak signal and the reference signal. In the present embodiment, the comparator 160 outputs, as the determination signal "comp", a high level ("1") if the value of the peak signal is the threshold "c_lvl" or more, and otherwise a low level ("0").

The focus detection apparatus 100 may further include a control unit 170. The control unit 170 controls operations of constituent components of the focus detection apparatus 100, such as the sensor units. For example, the control unit 170 supplies a control signal to each sensor unit and starts accumulating charges in the pixels. The operation of the control unit 170 will be described in detail later.

The focus detection apparatus 100 may further include a selector 180 and a focus detection unit 190. Each sensor unit supplies, to the selector 180, a pixel signal generated in the group of pixels. The control unit 170 supplies a control signal "outsel" to the selector 180 and controls the operation of the selector 180 so as to sequentially read out the pixel signals from the sensor units to the focus detection unit 190. The focus detection unit 190 uses the pixel signals supplied from the selector 180 to perform phase difference detection type focus detection, in which a phase difference between two images is detected. A well known method can be employed for the phase difference detection type focus detection, and thus a description thereof is omitted.

Figure 2:
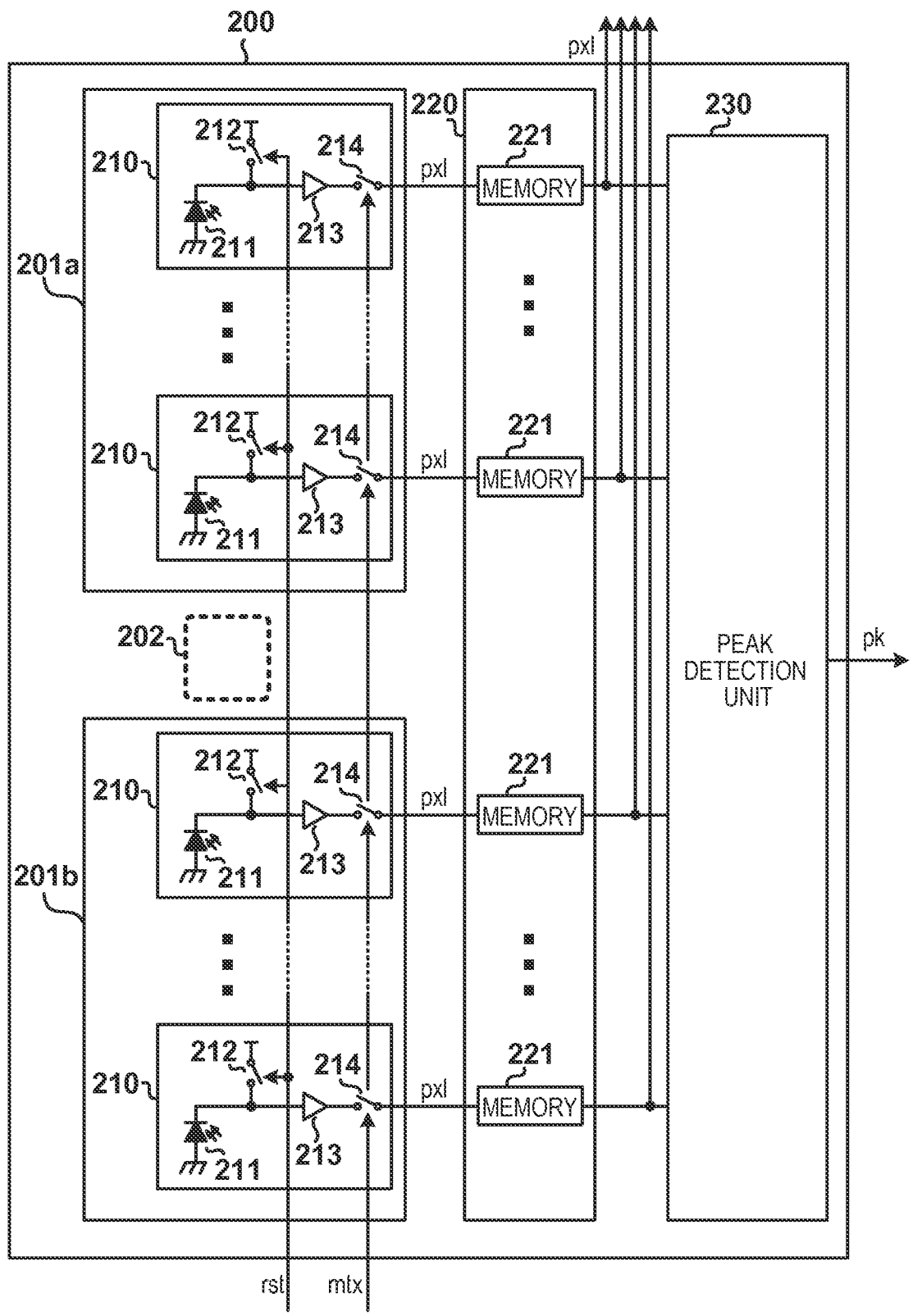
FIG. 2 is a block diagram illustrating an example of a configuration of a sensor unit according to some embodiments of the present invention.

FIG. 2 is a block diagram illustrating an example of a sensor unit 200. The sensor unit 200 may be used as any of the sensor units 111, 112, 121 to 124, 131, and 132 of the focus detection apparatus 100 of FIG. 1. The sensor unit 200 may include a plurality of pixels 210, a memory unit 220, and a peak detection unit 230. The plurality of pixels 210 are arranged divided into a pixel array 201a and a pixel array 201b that are arranged, with a focus detection area 202 being interposed therebetween. In the pixel arrays 201a and 201b, the pixels 210 are arranged in line in a direction away from the focus detection area 202. A first image is generated by pixel signals from the pixel array 201a and a second image is generated by pixel signals from the pixel array 201b.

Each pixel 210 may include a photodiode 211, which is an example of a photoelectric conversion unit, a switch 212, an amplifier 213, and a switch 214. The photodiode 211 generates charges whose amount depends on light that is incident on the pixel 210 and accumulates the generated charges. The amplifier 213 converts the charge accumulated in the photodiode 211 into voltage, amplifies the voltage, and outputs the amplified voltage. The switch 214 operates in accordance with a control signal "mtx", which is supplied from the control unit 170, and if the switch 214 is in a conductive state (ON), the voltage output from the amplifier 213 is output from the pixel 210, as a pixel signal "pxl". The switch 212 operates in accordance with a control signal "rst", which is supplied from the control unit 170, and if the switch 212 is in a conductive state (ON), the charges accumulated in the photodiode 211 are reset.

A memory unit 220 may include memories 221 that are provided for the respective pixels 210. Each memory 221 stores the pixel signal "pxl" supplied from the corresponding pixel 210, and outputs the stored value. A peak detection unit 230 supplies a pixel signal that has the largest value among the pixel signals "pxl" supplied from the memories 221, as a peak signal "pk", to the selector 150.

Figure 3:
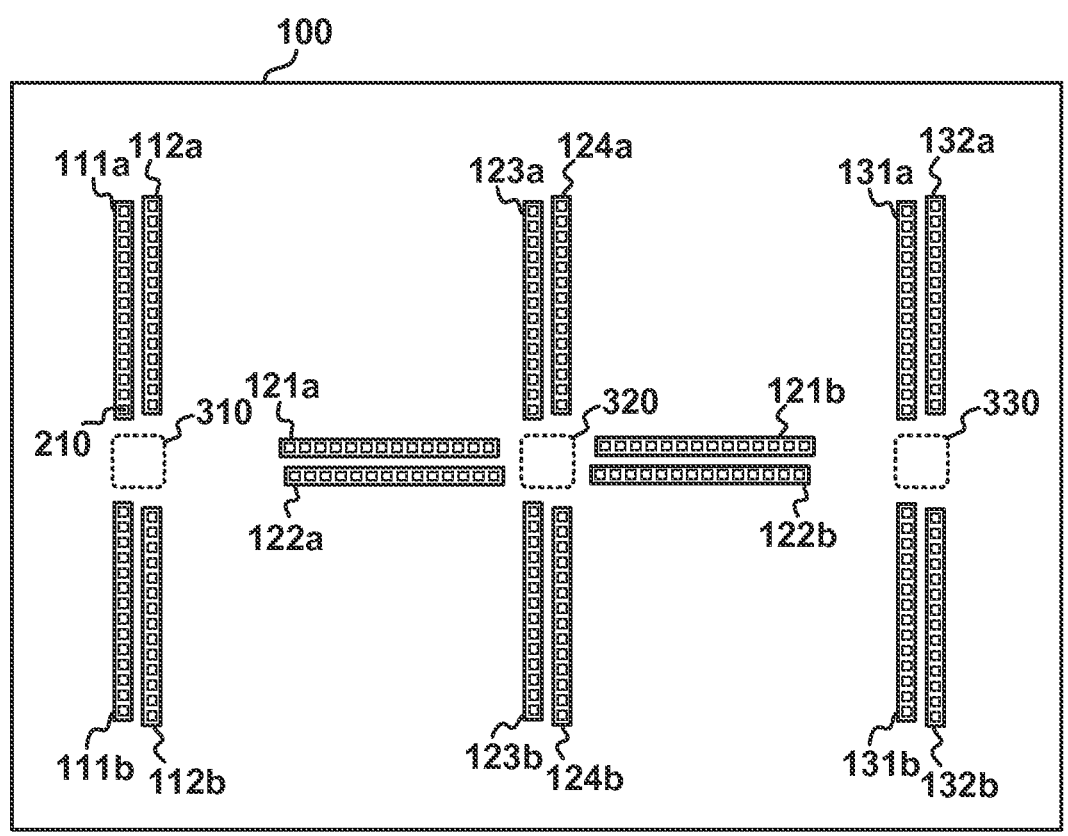
FIG. 3 is a layout diagram illustrating an example of arrangement of groups of pixels according to some embodiments of the present invention.

Next, an example of a layout of groups of pixels of the sensor units of the focus detection apparatus 100 will be described with reference to FIG. 3. The focus detection apparatus 100 may include three focus detection areas 310, 320, and 330. The sensor units 111 and 112 are arranged with respect to the focus detection area 310, the sensor units 121 to 124 are arranged with respect to the focus detection area 320, and the sensor units 131 and 132 are arranged with respect to the focus detection area 330. In FIG. 3, the pixel arrays 111a and 111b are pixel arrays that are included in the sensor unit 111, and respectively correspond to the pixel arrays 201a and 201b in FIG. 2. The pixel arrays included in other sensor units are each indicated by a reference numeral indicating the corresponding sensor unit with an index "a" or "b".

The two sensor units 111 and 112 arranged with respect to the focus detection area 310 can independently perform focus detection in the focus detection area 310. In the configuration of FIG. 3, the pixel arrays 111a and 111b, which extend in the longitudinal direction, and the pixel arrays 112a and 112b, which extend in the longitudinal direction, are arranged adjacent to each other, and the pixels 210 of the sensor unit 111 and the pixels 210 of the sensor unit 112 are disposed shifted by a half pitch. Therefore, by using the pixel signals from both the sensor unit 111 and the sensor unit 112, it is possible to perform focus detection in the focus detection area 310 with high resolution. The same applies to the focus detection area 330.

The four sensor units 121 to 124 arranged with respect to the focus detection area 320 can independently perform focus detection in the focus detection area 320. In the configuration of FIG. 3, the pixel arrays 121a and 121b, which extend in the lateral direction, and the pixel arrays 122a and 122b, which extend in the lateral direction, are arranged adjacent to each other, and the pixels 210 of the sensor unit 121 and the pixels 210 of the sensor unit 122 are disposed shifted by a half pitch. Also, the pixel arrays 123a and 123b, which extend in the longitudinal direction, and the pixel arrays 124a and 124b, which extend in the longitudinal direction, are arranged adjacent to each other, and the pixels 210 of the sensor unit 123 and the pixels 210 of the sensor unit 124 are disposed shifted by a half pitch. Therefore, by using all the pixel signals from the sensor units 121 to 124, it is possible to perform focus detection in the longitudinal and lateral directions in the focus detection area 320 with high resolution.

Figure 4:
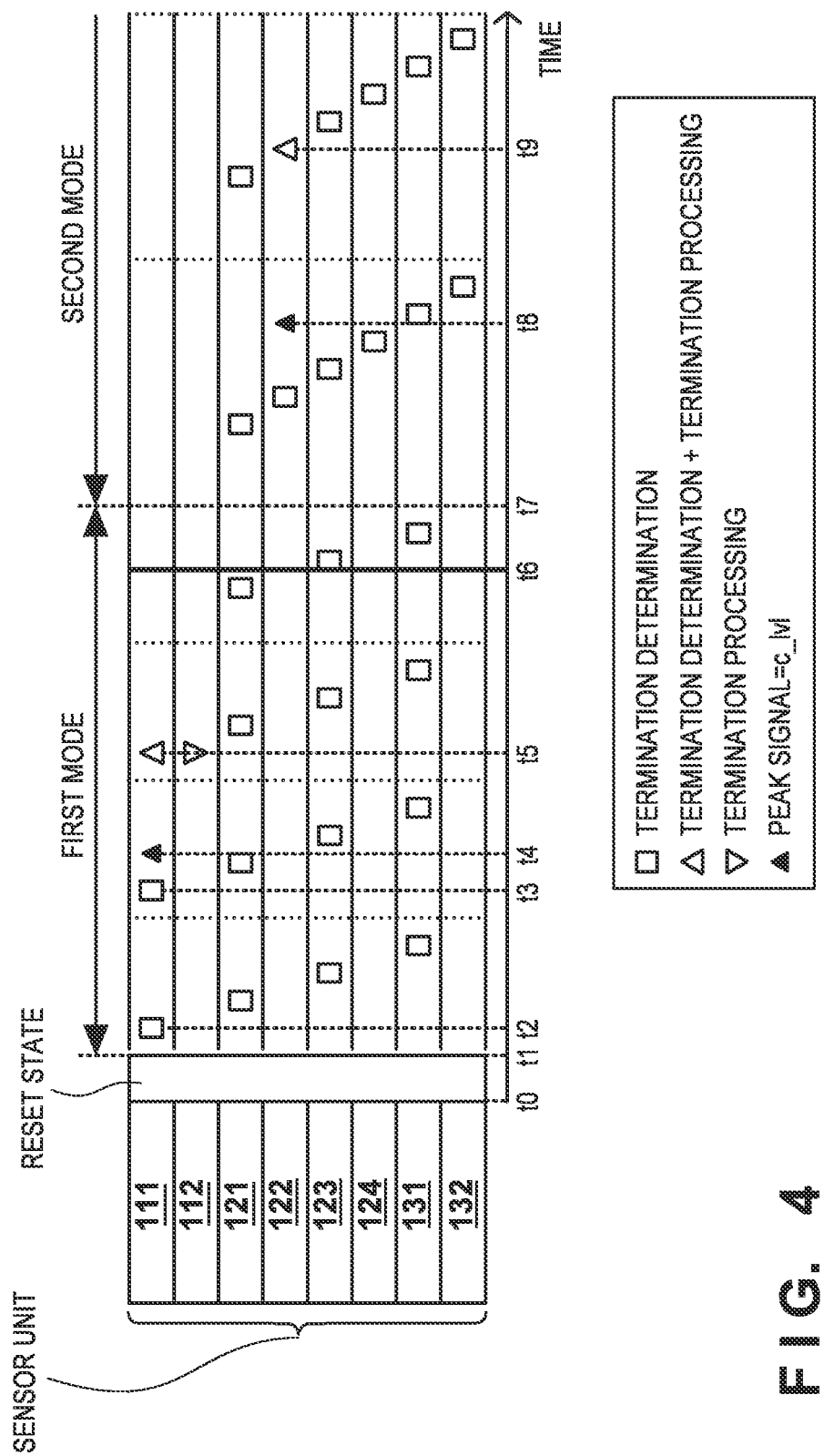
FIG. 4 is a diagram illustrating an outline of an example of operations according to some embodiments of the present invention.

Next, an outline of an example of operations of the focus detection apparatus 100 will be described with reference to FIG. 4. A horizontal axis in FIG. 4 denotes time, and FIG. 4 illustrates operations with respect to the sensor units at each point of time. When, at time "t0", an instruction to perform focus detection is externally received from, for example, a CPU of an image capturing device (not shown) in which the focus detection apparatus 100 is provided, the focus detection apparatus 100 configures an initial setting. In the present embodiment, as the initial setting, the control unit 170 turns the switches 212 and 214 of all the sensor units to the conductive state. With this, the charges accumulated in the pixels 210 are reset, and the pixel signals at the time of the reset are stored in the memories 221.

At time "t1", the control unit 170 switches the control signal "rst" that is supplied to the sensor units so that the switches 212 of all the pixels 210 in the sensor units are turned to the non-conductive state (OFF). After that, the amount of accumulated charges in each pixel 210 increases over time according to light that is incident on the corresponding pixel 210, resulting in an increase in the pixel signal "pxl" that is output from the pixel 210. Also at time "t1", the control unit 170 sends a signal "start" to the selection control unit 140 to notify the selection control unit 140 of the start of charge accumulation.

When the charge accumulation has started in the pixels 210, the focus detection apparatus 100 performs, with respect to each sensor unit, a termination determination for determining whether or not the pixel signal that increases over time satisfies a termination condition that the pixel signal is sufficiently high to perform focus detection. If it is determined that the pixel signal satisfies the termination condition, the focus detection apparatus 100 performs termination processing for terminating the increase of the pixel signal on the sensor unit that outputs the sufficiently high pixel signal. If it is determined that the pixel signal does not satisfy the termination condition, the focus detection apparatus 100 continues to increase the pixel signal, and repeatedly performs the termination determination.

In the present embodiment, termination determination is performed by the comparator 160 comparing the peak signal "pk" from the sensor unit with the reference signal, and if the peak signal "pk" is the threshold "c_lvl" or more, it is determined that the termination condition is satisfied. That is, the comparator 160 functions as a determination unit for performing a termination determination. Termination processing in the present embodiment is performed by the control unit 170 turning switches 214 of all pixels 210 of a sensor unit that satisfies the termination condition to the non-conductive state. By turning the switches 214 to the non-conductive state, the increase in the pixel signals "pxl" that is supplied to the memories 221 is stopped, and the pixel signals that satisfy the termination condition are stored in the memories 221. The pixel signals "pxl" stored in the memories 221 after completion of the termination processing are read out to the focus detection unit 190, to perform focus detection.

With the start of charge accumulation, the focus detection apparatus 100 starts operating in a first mode in which only some sensor units 111, 121, 123, and 131 are sequentially scanned and termination determinations are performed. Then, if a mode switching condition is satisfied, the focus detection apparatus 100 shifts to and operates in a second mode in which all the sensor units are sequentially scanned and termination determinations are performed. That is, the selection control unit 140 functions as a setting unit that sets the sensor units 111, 121, 123, and 131 as determination targets in the first mode, and sets all the sensor units as determination targets in the second mode. The number of sensor units that are set as the determination targets is smaller in the first mode than in the second mode, and thus an interval (time period during which one cycle of termination determinations is completed) between termination determinations performed with respect to the same sensor unit is shorter in the first mode than in the second mode. It can be assumed that light with a high luminance is incident on a sensor unit that satisfies the termination condition during the first mode. Therefore, in the first mode, by reducing the interval between the termination determinations and reducing a time period from the peak pixel signal having actually exceeded the threshold "c_lvl" until the termination processing is performed, it is possible to suppress the pixel signal from increasing to exceed the dynamic range. On the other hand, it can be assumed that light with a luminance that is a normal level or less is incident on the sensor unit that satisfies the termination condition during the second mode. Therefore, in the second mode, even if the interval between the termination determinations is long, the pixel signal is less likely to increase to exceed the dynamic range. Accordingly, the accuracy of the focus detection performed by the focus detection apparatus 100 is improved.

At time "t2", the selection control unit 140 selects a sensor unit 111, and the comparator 160 performs a termination determination with respect to the selected sensor unit 111. The selector 150 functions as a selection unit that selects one sensor unit from among the sensor units serving as the determination targets. The comparison result is supplied, as the determination signal "comp", to the control unit 170. In the termination determination at time "t2", the sensor unit 111 is assumed not to satisfy the termination condition. Then, the selection control unit 140 sequentially selects the sensor units 121, 123, and 131, and the comparator 160 performs a termination determination with respect to each selected sensor unit. None of the sensor units is assumed to satisfy the termination condition. Hereinafter, processing in which each of the sensor units is selected once as the determination target and the termination determination is performed for each sensor unit is referred to as a cycle.

At time "t3", the selection control unit 140 selects the sensor unit 111 again in the next cycle, and the comparator 160 performs a termination determination with respect to the selected sensor unit 111. Also in the termination determination at time "t3", the sensor unit 111 is assumed not to satisfy the termination condition. At time "t4", the peak signal "pk" from the sensor unit 111 that increases over time is assumed to reach the threshold "c_lvl".

At time "t5", the selection control unit 140 selects the sensor unit 111 again, and the comparator 160 performs a termination determination with respect to the selected sensor unit 111. In the termination determination at time "t5", the sensor unit 111 satisfies the termination condition. Accordingly, the control unit 170 performs termination processing on the sensor unit 111. If the interval between time "t4" and time "t5" is long, the termination processing will be performed later on the sensor unit 111 that has already satisfied the termination condition. As a result, pixel signals may increase too much and pixel signals of a plurality of pixels exceed the dynamic range, resulting in an error in the phase difference detection type focus detection. In the present embodiment, since in the first mode, termination determinations are performed only with respect to a part of the sensor units, it is possible to reduce the interval between time "t4" and time "t5".

If it is determined, at time "t5", that the sensor unit 111 satisfies the termination condition, the control unit 170 may perform termination processing likewise on the sensor unit 112. Since the pixel arrays 111a and 111b of the sensor unit 111, and the pixel arrays 112a and 112b of the sensor unit 112 are arranged adjacent to each other, it can be assumed that they receive similar amounts of light. Accordingly, there may be a case where, even if a termination determination is performed with respect to the sensor unit 112 in the second mode, pixel signals of a plurality of pixels in the sensor unit 112 have already exceeded the dynamic range. Therefore, in the present embodiment, if it is determined that the sensor unit 111 satisfies the termination condition, termination processing is also performed on the sensor unit 112 that is adjacent to the sensor unit 111. The same applies to other sensor units, that is, termination processing may be performed on a sensor unit that is arranged with respect to the same focus detection area as that of the sensor unit determined to satisfy the termination condition. Specifically, the control unit 170 may also perform termination processing on a sensor unit that is adjacent to the sensor unit determined to satisfy the termination condition, among the sensor units arranged with respect to the same focus detection area.

The selection control unit 140 has a timer function and measures the time elapsed from the start of the first mode. If it is determined that this elapsed time has exceeded a predetermined time, the selection control unit 140 shifts from the first mode to the second mode. That is, in the present embodiment, the mode switching condition is that the time elapsed from the start of the first mode exceeds a predetermined value, and the focus detection apparatus 100 continues to operate in the first mode until the mode switching condition is satisfied. In the present embodiment, the selection control unit 140 determines each time a cycle ends whether or not the mode switching condition is satisfied (mode switching determination). In other embodiments, the selection control unit 140 may perform a mode switching determination each time a termination determination is performed with respect to a sensor unit.

In the example of FIG. 4, it is assumed that, at time "t6", a predetermined time has elapsed from the start of the first mode. At time "t7", it is determined that the mode switching condition is satisfied, and thus the selection control unit 140 shifts to the second mode, includes in the determination targets sensor units that were not included in the determination targets in the first mode, and performs termination determinations thereon. Here, since no termination determination is necessary with respect to the sensor units 111 and 112 on which termination processing has already been performed, the focus detection apparatus does not perform further termination determinations with respect to the sensor units 111 and 112. Therefore, in the second mode, termination determinations are repeatedly performed with respect to the sensor units 121 to 124, 131, and 132.

At time "t8", the peak signal "pk" from the sensor unit 122 that increases over time is assumed to reach the threshold "c_lvl". Then, at time "t9", the selection control unit 140 selects the sensor unit 122 and the comparator 160 performs a termination determination with respect to the selected sensor unit 122. In the termination determination at time "t9", the sensor unit 122 satisfies the termination condition. Then, the control unit 170 performs termination processing on the sensor unit 122. Since the amount of light that is incident on the sensor unit 122 can be assumed to be a normal luminance or less, it is less likely that pixel signals of a plurality of pixels in the sensor unit 122 will exceed the dynamic range even if the interval from time "t8" to time "t9" is long. In the second mode, a termination determination is performed independently with respect to the sensor unit 121 that is adjacent to the sensor unit 122. Therefore, if it is determined that the sensor unit 122 satisfies the termination condition, termination processing may also be performed on the sensor unit 121. Alternatively, if it is determined that the sensor unit 121 satisfies the termination condition, termination processing may then be performed on the sensor unit 121.

Figure 5:
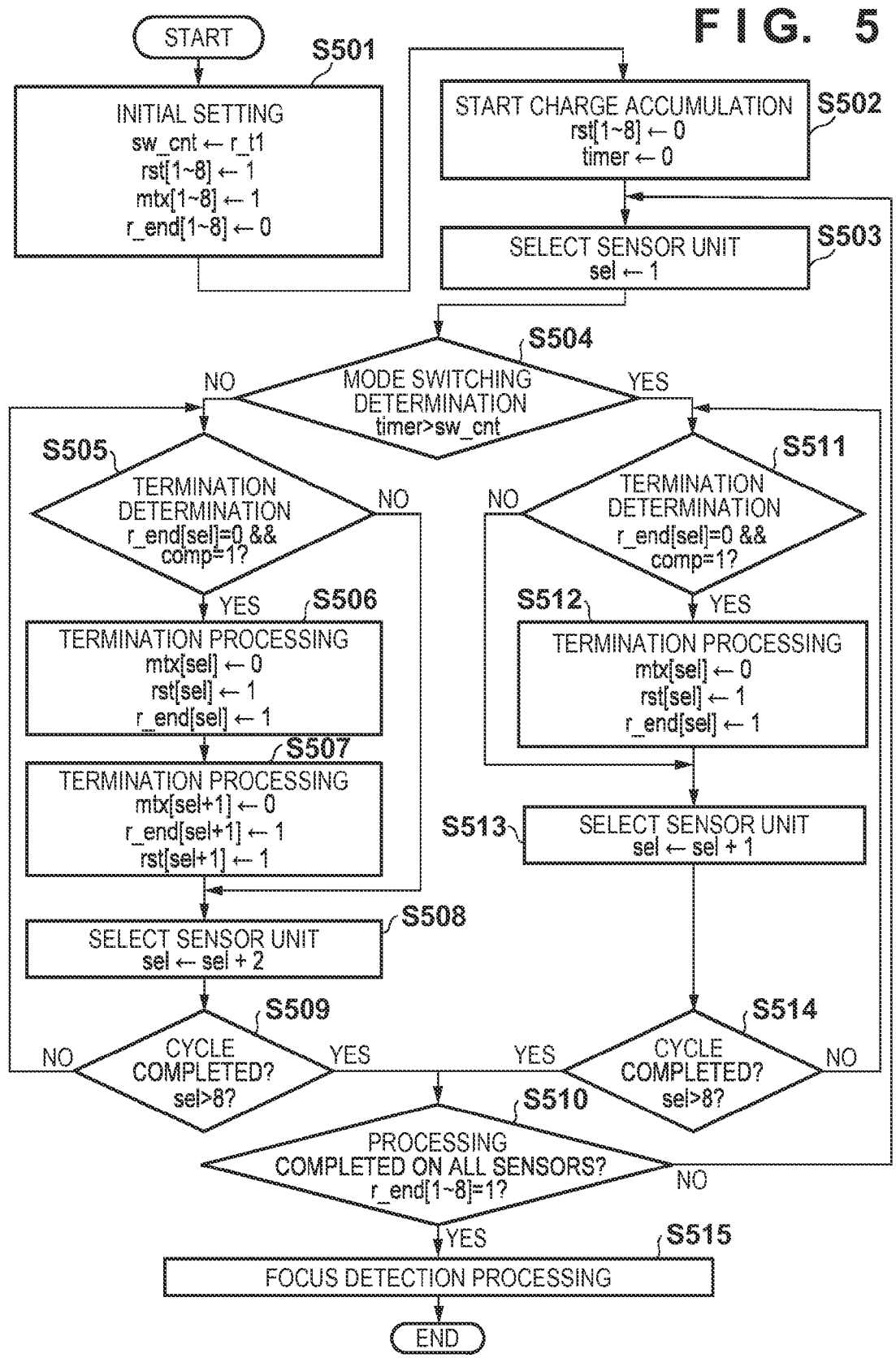
FIG. 5 is a flowchart illustrating details of an example of operations according to some embodiments of the present invention.

Next, an example of operations of the focus detection apparatus 100 will be described in detail with reference to the flowchart of FIG. 5. In FIG. 5, arguments 1 to 8 in parentheses correspond to the sensor units 111, 112, 121 to 124, 131, and 132, respectively. For example, rst[1] denotes a control signal that is supplied from the control unit 170 to the switches 212 of the sensor unit 111. In step S501, the focus detection apparatus 100 configures the initial settings. Step S501 is equivalent to the processing at time "t0" of FIG. 4. First, the control unit 170 substitutes a predetermined value "r_t1" that is externally set for a variable "sw_cnt". This predetermined value "r_t1" corresponds to the time period from the above-described time "t1" to time "t6", and is used for a mode switching determination. Then, the control unit 170 sets the value of the control signal "rst" that is supplied to the switches 212 of all the pixels 210 of the sensor units to "1", and turns the switches 212 to the conductive state. With this, the photodiodes 211 of the pixels 210 are reset. Further, the control unit 170 sets the value of the control signal "mtx" that is supplied to the switches 214 of all the pixels 210 of the sensor units to "1", and turns the switches 212 to the conductive state. With this, the pixel signals at the time of resetting the pixels are stored in the memories 221. Further, the control unit 170 initializes flags "r_end" that each indicate whether or not termination processing has already been performed on the sensor unit to "0". Flag "r_end" is settable for each sensor unit, and if the flag "r_end" is "0", this means that termination processing has not been performed on the corresponding sensor unit, and if the flag "r_end" is "1", this means that termination processing has been performed on the corresponding sensor unit.

Next, in step S502, the control unit 170 sets the value of the control signal "rst" that is supplied to the switches 212 of all the pixels 210 of the sensor units to "0", and turns the switches 212 to the non-conductive state. After that, charge accumulation starts in the photodiodes 211 of the pixels 210. At the same time, the control unit 170 notifies the selection control unit 140 of the start of charge accumulation, and the selection control unit 140 starts measuring time. The measurement of time is realized by counting up a count value timer from "0" at arbitrary clocks. Step S502 is equivalent to the processing at time "t1" in FIG. 4.

Next, in step S503, the selection control unit 140 substitutes "1" for a variable "sel" to select the sensor unit 111. Variable "sel" is a variable that indicates the currently selected sensor unit. In step S504, the selection control unit 140 determines whether or not the count value timer exceeds the variable "sw_cnt", that is, whether or not the mode switching condition is satisfied. If the count value timer does not exceed the variable "sw_cnt" (No in step S504), the procedure shifts to step S505, and the focus detection apparatus 100 operates in the first mode. If the count value timer has exceeded the variable "sw_cnt" (Yes in step S504), the procedure shifts to step S511, and the focus detection apparatus 100 operates in the second mode.

In step S505, the control unit 170 performs a termination determination. The sensor unit that is currently selected by the selection control unit 140 is notified to the control unit 170 via a signal "psel". First, the control unit 170 determines whether or not the value of the flag "r_end"[sel] is "0". If the value of the flag "r_end"[sel] is "1" (No in step S505), it is not necessary to further perform the termination determination with respect to the selected sensor, and thus the procedure shifts to step S508. If the value of the flag "r_end"[sel] is "0", the control unit 170 determines whether the determination signal "comp" from the comparator 160 is "1" or "0". As described above, the determination signal "comp" is a high level "1" if the value of the peak signal is the threshold "c_lvl" or more, and otherwise a low level "0". If the determination signal "comp" is "1", it is determined that the selected sensor unit satisfies the termination condition (Yes in step S505), and the procedure shifts to step S506. If the determination signal "comp" is "0", it is determined that the selected sensor unit does not satisfy the termination condition (No in step S505), and the procedure shifts to step S508.

In step S506, the control unit 170 performs termination processing on the selected sensor unit. The control unit 170 first sets the value of the control signal "mtx" that is supplied to the switches 214 of all the pixels 210 of the selected sensor unit to "0", and turns the switches 214 to the non-conductive state. With this, each amplifier 213 is separated from the corresponding memory 221, and an increase in pixel signals that are stored in the memory 221 stops. Also, the control unit 170 turns the switches 212 to the conductive state, and resets the photodiodes 211. Further, the control unit 170 changes the value of the flag "r_end"[sel] to "1", and records completion of the termination processing on the selected sensor unit. Next, in step S507, the control unit 170 performs termination processing on a sensor unit that is adjacent to the selected sensor unit. In the present embodiment, the sensor unit indicated by "sel+1" is adjacent to the sensor unit indicated by "sel".

In step S508, the selection control unit 140 selects a next sensor unit. Since step S508 is processing in the first mode, the selection control unit 140 increments the variable "sel" by "2", and selects every other sensor unit. In step S509, if sel>8 is met (No in step S509), the selection control unit 140 determines that a cycle of termination determinations with respect to the sensor units serving as the determination targets is completed, and the procedure shifts to step S510. If, in step S509, sel>8 is not met (Yes in step S509), the procedure returns to step S505, and a termination determination is performed with respect to a newly selected sensor unit.

In step S510, the control unit 170 determines whether or not termination processing is completed on all the sensor units. If there is a sensor unit on which termination processing is not completed (No in step S510), the procedure returns to step S504, and the selection control unit 140 starts a next cycle. If it is determined that termination processing is completed on all the sensor units (Yes in step S510), the procedure shifts to step S515, and the focus detection unit 190 performs focus detection using the pixel signals stored in the sensor units.

Next, operations of the focus detection apparatus 100 in the second mode will be described. Steps S511, S512, and S514 are respectively equivalent to steps S505, S506, and S509, and therefore descriptions thereof are omitted. In step S513, the selection control unit 140 selects a next sensor unit. Since step S513 is processing in the second mode, the next sensor unit is selected from all the sensor units. In the present embodiment, by incrementing the variable "sel" by "1", the sensor units are sequentially selected.

A focus detection apparatus according to a second embodiment is similar in configuration to, but different in operation from, the focus detection apparatus 100 according to the first embodiment. In the first embodiment, the mode switching condition is defined as being that a predetermined time has elapsed from the start of the first mode. In the present embodiment, the mode switching condition is defined as being that any one of the sensor units is determined to satisfy the termination condition. Therefore, in the present embodiment, it is not necessary for the selection control unit 140 to have the timer function.

Figure 6:
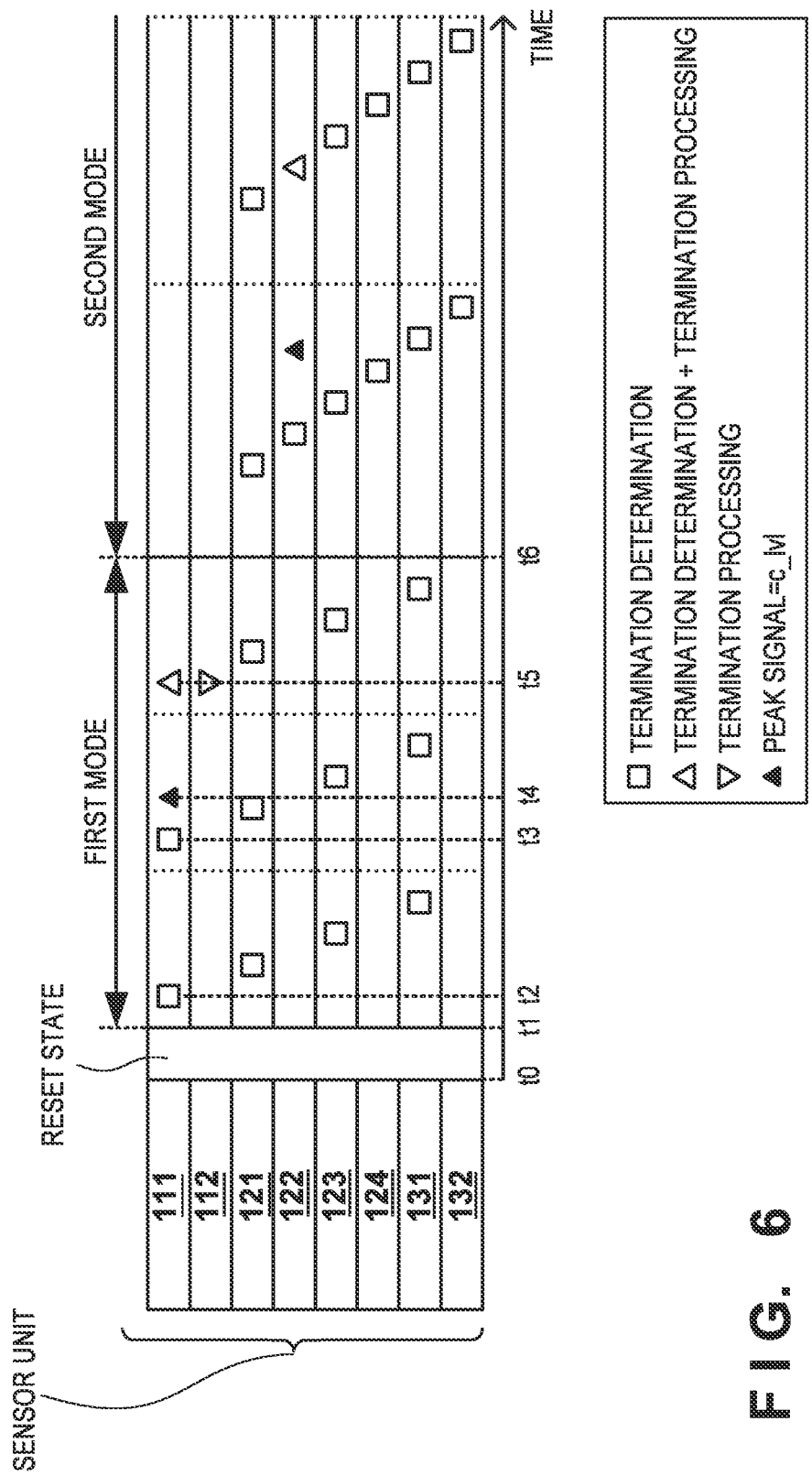
FIG. 6 is a diagram illustrating an outline of an example of operations according to some other embodiments of the present invention.

An outline of an example of operations of the focus detection apparatus in the present embodiment will be described with reference to FIG. 6. Similar processing as that in the first embodiment is performed and, at time "t5", the sensor unit 111 is determined to satisfy the termination condition. Also in the present embodiment, the selection control unit 140 performs a mode switching determination each time a cycle ends. Then, at time "t6", the selection control unit 140 performs a mode switching determination, and determines that the sensor unit 111 has satisfied the termination condition at time "t5", and shifts to the second mode. Processing in the second mode is similar to that of the first embodiment, and thus a description thereof is omitted. Also in the present embodiment, the selection control unit 140 may perform a mode switching determination each time a termination determination is performed with respect to a sensor unit.

Also in the present embodiment, the focus detection apparatus operates according to the flowchart of FIG. 5, but the operation of the switching determination in step S504 is different. In the mode switching determination, the selection control unit 140 determines whether or not at least one of the flags "r_end" is set to "1". If this condition is satisfied (Yes in step S504), this means that at least one sensor unit satisfies the termination condition, so the procedure shifts to step S511 and the focus detection apparatus operates in the second mode. If this condition is not satisfied (No in step S504), this means that there is no sensor unit that satisfies the termination condition, so the procedure shifts to step S505 and the focus detection apparatus operates in the first mode.

The focus detection apparatus according to the present embodiment assumes that light that is incident on the focus detection area with respect to which the sensor unit that has first satisfied the termination condition is arranged has a high luminance, and light that is incident on other focus detection units has a luminance that is a normal level or less, and performs a mode switching determination. The present embodiment can achieve a similar effect to that in the first embodiment. In the above description, the focus detection apparatus shifts to the second mode when at least one sensor unit satisfies the termination condition. However, the number of sensor units that are used for the switching condition is not limited to one, and the focus detection apparatus may shift to the second mode when at least two sensor units satisfy the termination condition. Also, a mode switching determination in the first embodiment and a mode switching determination in the second embodiment may be combined. For example, the focus detection apparatus may shift to the second mode if at least one of the mode switching condition in the first embodiment and the mode switching condition in the second embodiment is satisfied or if both of them are satisfied.

Figure 7:
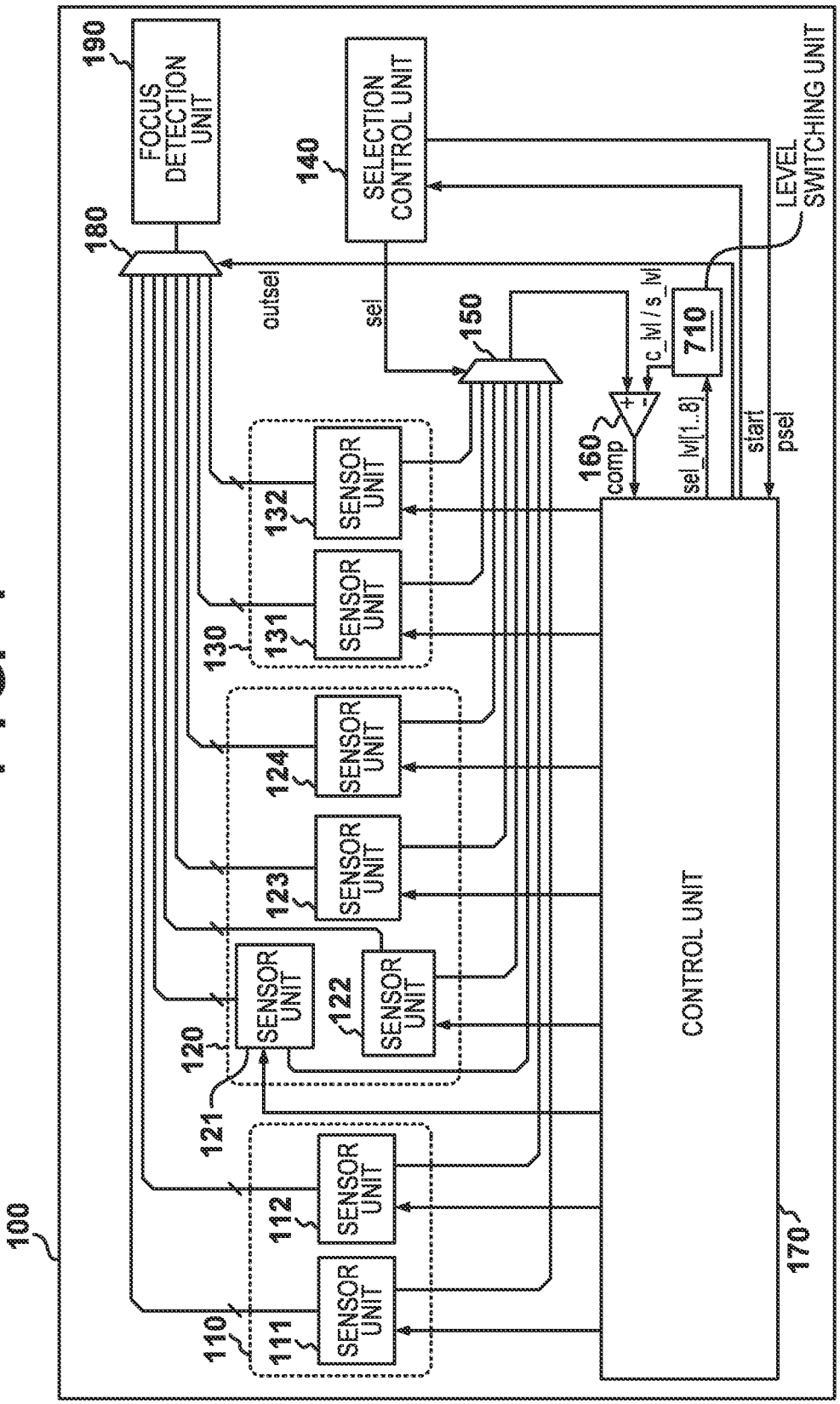
FIG. 7 is a block diagram illustrating an example of a configuration of a focus detection apparatus according to some other embodiments of the present invention.

A configuration of a focus detection apparatus 700 according to a third embodiment will be described with reference to FIG. 7. The focus detection apparatus 700 is similar to the focus detection apparatus 100 except that a level switching unit 710 is further provided. The level switching unit 710 supplies a reference signal to the comparator 160, and the comparator 160 compares a peak signal "pk" with the reference signal, similar to the first embodiment. In the present embodiment, the level switching unit 710 supplies, as the reference signal, the threshold "c_lvl" (first threshold) or a threshold "s_lvl" (second threshold). Here, the threshold "s_lvl" is smaller than the threshold "c_lvl".

Figure 8:
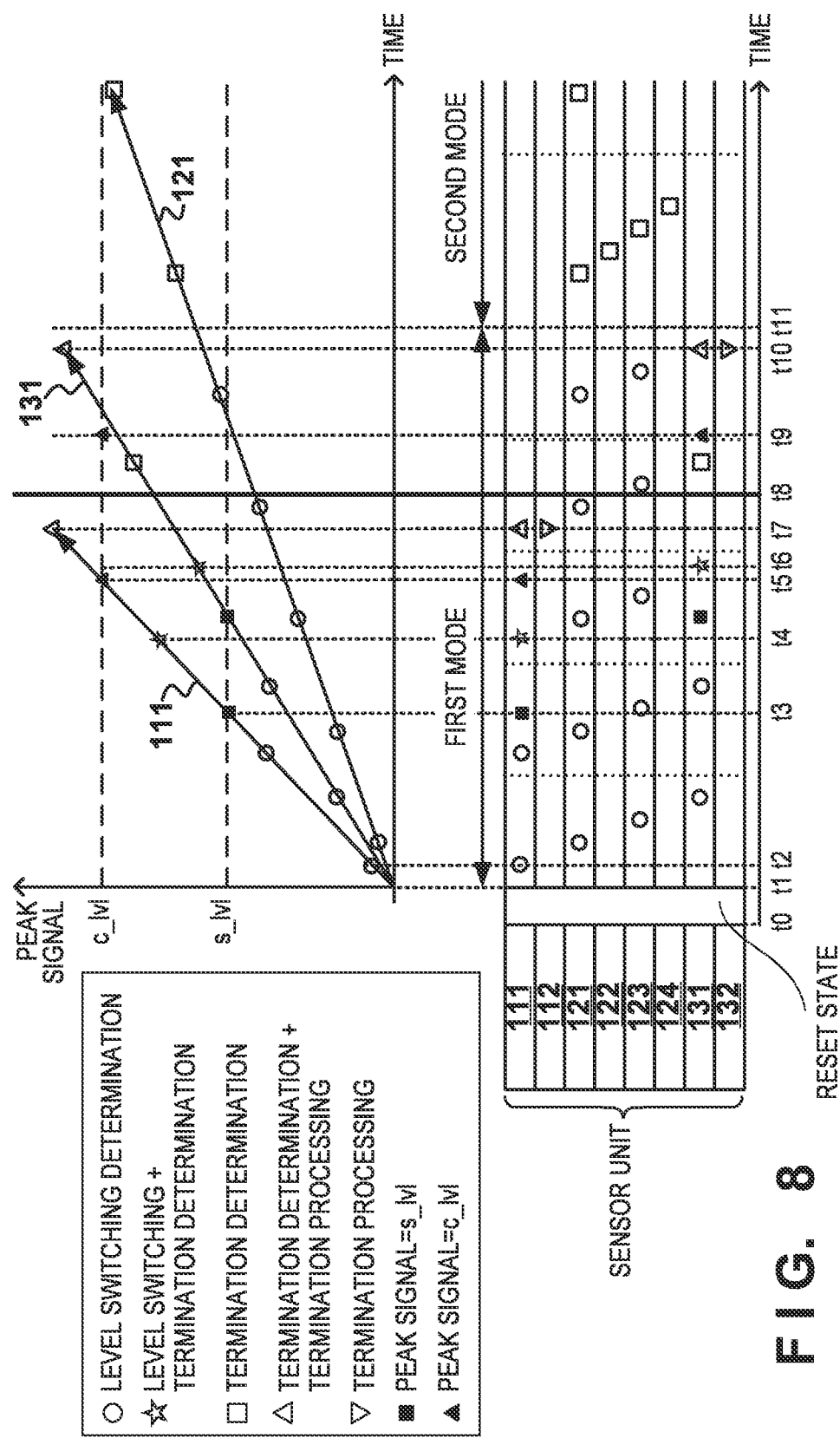
FIG. 8 is a diagram illustrating an outline of an example of operations according to some other embodiments of the present invention.

Next, an outline of an example of operations of the focus detection apparatus 700 will be described with reference to FIG. 8. A horizontal axis in the lower figure of FIG. 8 denotes time, and the lower figure illustrates operations with respect to the sensor units at each point of time. Also, the upper figure of FIG. 8 is a graph that focuses on the sensor units 111, 121, and 131 and illustrates values of the peak signals thereof at each point in time. In the present embodiment, the increase rate of the peak signal is used as a switching condition, in addition to the time elapsed from the start of the first mode.

Similar to the first embodiment, at time "t0", the control unit 170 configures the initial settings, and at time "t1", the control unit 170 starts charge accumulation and the focus detection apparatus 700 operates in the first mode. In the first mode, the selection control unit 140 sequentially scans and selects the sensor units 111, 121, 123, and 131. In the first mode of the present embodiment, the comparator 160 determines whether or not a level switching condition is satisfied (level switching determination) before performing determination of whether or not a termination condition is satisfied (termination determination). Here, the termination condition is that a peak signal exceeds the threshold "c_lvl", as with in the first embodiment. Also, the level switching condition is that the peak signal "pk" exceeds the threshold "s_lvl". It is assumed that a peak signal of a sensor unit that satisfies the level switching condition before a predetermined time has elapsed from the start of the first mode increases at a certain rate. Therefore, the focus detection apparatus 700 continues to operate in the first mode until such a sensor unit satisfies the termination condition and is subjected to termination processing.

At time "t2", the selection control unit 140 selects the sensor unit 111, and the comparator 160 performs a level switching determination with respect to the selected sensor unit 111. In the level switching determination at time "t2", the sensor unit 111 is assumed not to satisfy the level switching condition. Then, the selection control unit 140 sequentially selects the sensor units 121, 123, and 131, and the comparator 160 performs a level switching determination with respect to each selected sensor unit. None of the sensor units is assumed to satisfy the level switching condition.

At time "t3", the peak signal "pk" from the sensor unit 111 that increases over time is assumed to reach the threshold "s_lvl". At time "t4", the selection control unit 140 selects the sensor unit 111 again, and the comparator 160 performs a level switching determination with respect to the selected sensor unit 111. In the level switching determination at time "t4", the sensor unit 111 satisfies the level switching condition. That is, it is assumed that light with a high luminance is incident on the sensor unit 111. If it is determined that the level switching condition is satisfied, the control unit 170 switches the level of the reference signal that is supplied to the comparator 160 from the level switching unit to the threshold "c_lvl". Then, the comparator 160 performs a termination determination at time "t4" with respect to the currently selected sensor unit 111. In the termination determination at time "t4", the sensor unit 111 is assumed not to satisfy the termination condition. If the sensor unit 111 is selected after time "t4", a termination determination is performed without a level switching determination being performed.

At time "t5", the peak signal "pk" from the sensor unit 111 that increases over time is assumed to reach the threshold "c_lvl". At time "t6", the selection control unit 140 selects the sensor unit 131, and the comparator 160 performs a level switching determination with respect to the selected sensor unit 131. Since the peak signal of the sensor unit 131 at time "t6" exceeds the threshold "s_lvl", the same processing as the processing performed on the sensor unit 111 at time "t4" is performed on the sensor unit 131. In the termination determination at time "t7", the sensor unit 111 satisfies the termination condition. Accordingly, the control unit 170 performs termination processing on the sensor unit 111. Similar to the first embodiment, the control unit 170 performs termination processing also on the sensor unit 112. In the processing after that, the focus detection apparatus does not perform termination determinations with respect to the sensor units 111 and 112 on which termination processing has already been completed.

At time "t7", it is assumed that the predetermined time has elapsed from the start of the first mode. Then, at time "t9" at which a cycle ends, the selection control unit 140 performs a mode switching determination. The sensor units 111 and 131 are determined to satisfy the level switching condition at time "t9". Termination processing has already been performed on the sensor unit 111 but not on the sensor unit 131. Therefore, if the focus detection apparatus 700 shifts to the second mode, pixel signals of a plurality of pixels in the sensor unit 131 are likely to exceed the dynamic range. Therefore, the focus detection apparatus 700 continues to operate in the first mode.

In a termination determination at time "t10", the sensor unit 131 satisfies the termination condition. Accordingly, the control unit 170 performs termination processing on the sensor unit 131. The control unit 170 performs termination processing also on the sensor unit 132. In the processing after that, the focus detection apparatus does not perform termination determinations with respect to the sensor units 131 and 132 on which the termination processing has already been completed.

At time "t11", the selection control unit 140 again performs a mode switching determination. Since, at the point of time "t11", the termination processing has already been completed on both the sensor units 111 and 131, the mode switching condition is satisfied. Accordingly, the focus detection apparatus 700 shifts to the second mode. The operations of the focus detection apparatus 700 in the second mode are similar to those of the focus detection apparatus 100 of the first embodiment. In the second mode, the comparator 160 performs, instead of a level switching determination, a termination determination. Since the sensor units 111, 112, 131, and 132 have already been subjected to the termination processing, the focus detection apparatus 700 sequentially selects the remained sensor units 121 to 124, and performs a termination determination with respect to each selected sensor unit.

Figure 9A:
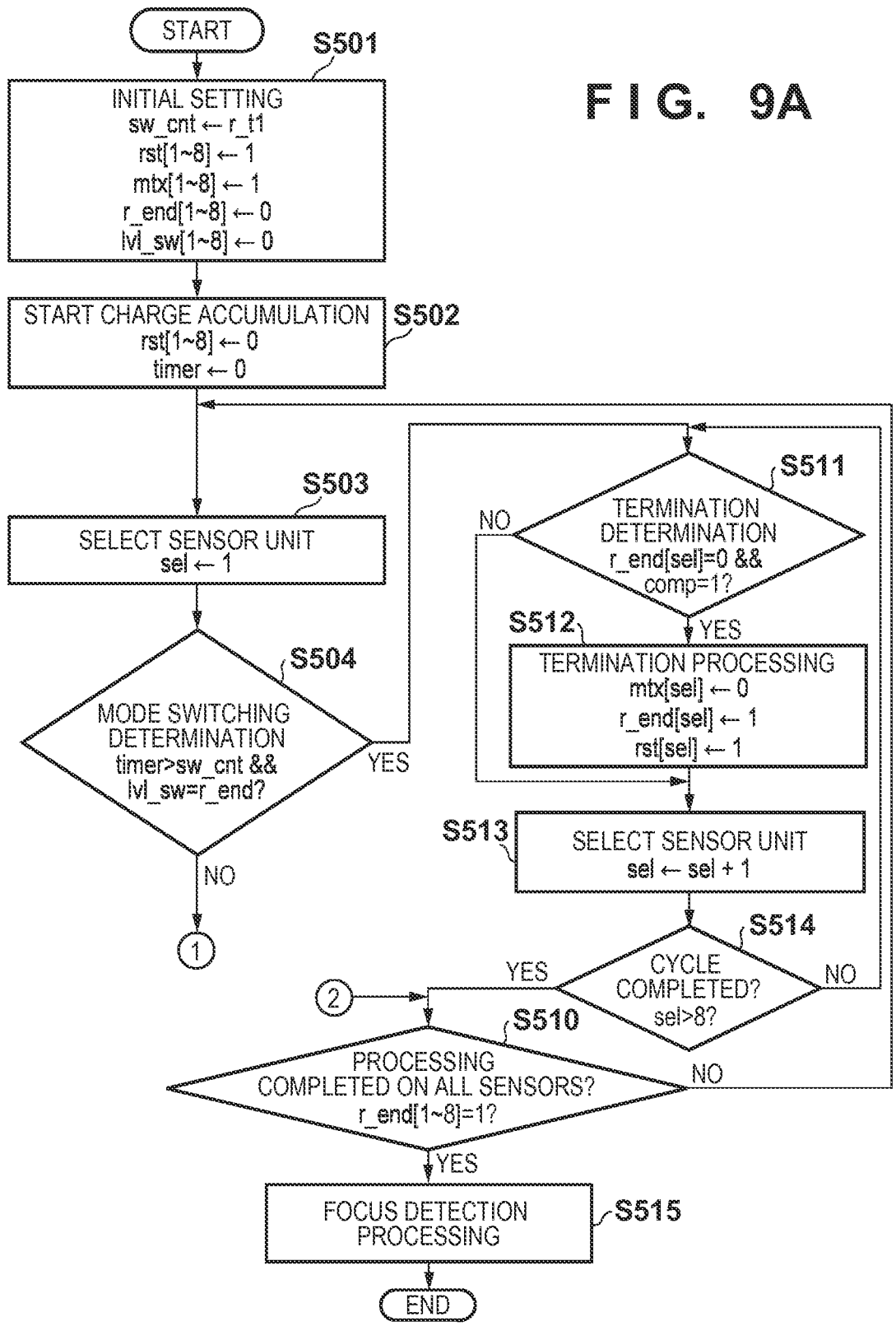
FIGS. 9A and 9B are flowcharts illustrating details of an example of operations according to some other embodiments of the present invention.
Figure 9B:
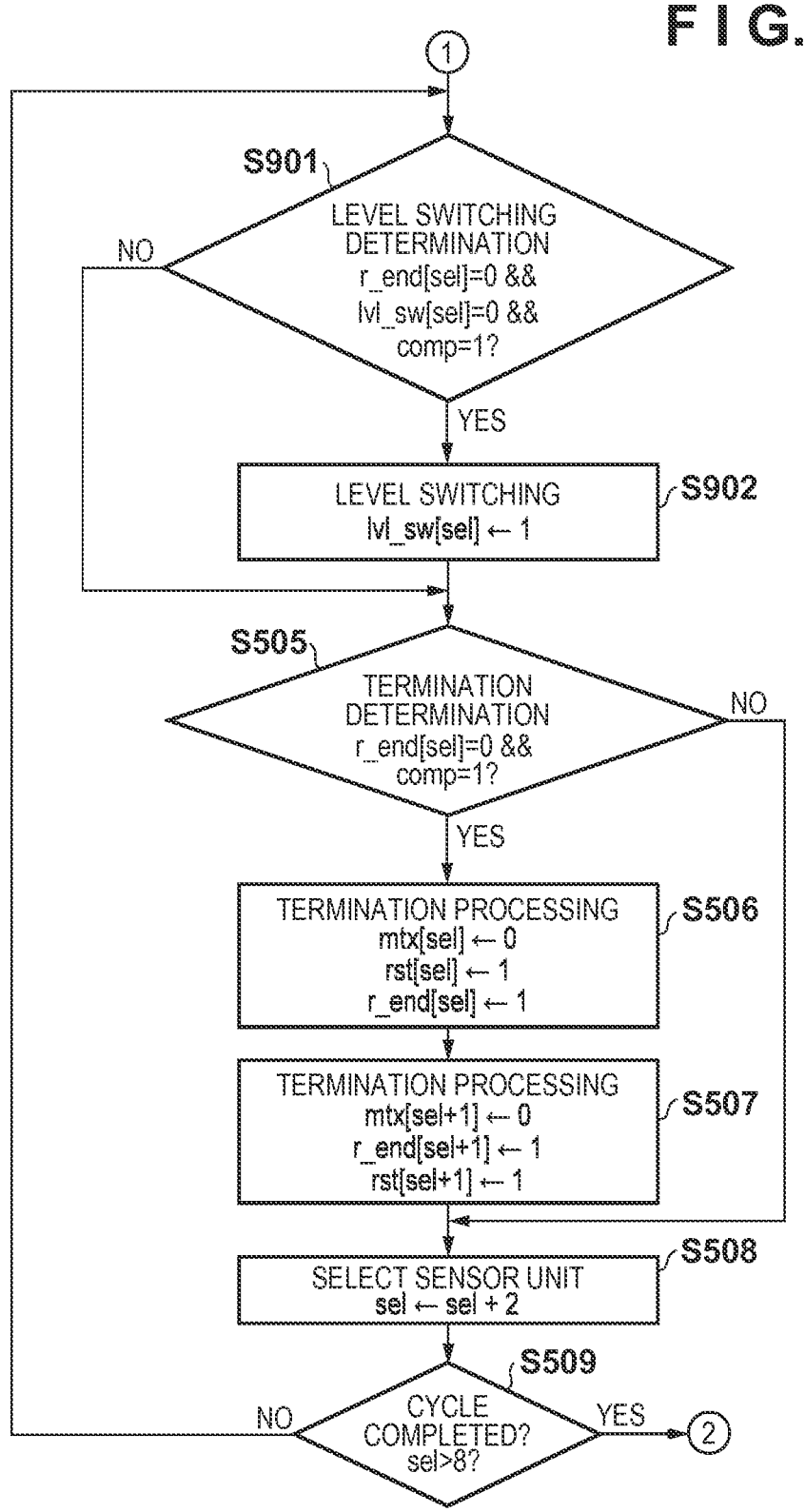

Next, an example of operations of the focus detection apparatus 700 will be described in detail with reference to the flowchart of FIGS. 9A and 9B. The same reference numerals are given to steps similar to those performed by the focus detection apparatus 100 of the first embodiment, and an overlapping description thereof is omitted. In the initial setting in step S501, in addition to the initial setting of the first embodiment, the control unit 170 initializes flags "lvl_sw" that each indicates the level of the reference signal that is to be supplied to the comparator 160 by a level switching unit 710 to "0". Flag "lvl_sw" is settable for each sensor unit, and if the flag is "0", this means that the level of the reference signal is "s_lvl", and if the flag is "1", this means that the level of the reference signal is "c_lvl".

In step S504, the control unit 170 performs a mode switching determination. If the predetermined time has not elapsed from the start of the first mode (No in step S504), the procedure shifts to step S901, and the focus detection apparatus 700 operates in the first mode. Even if the predetermined time has elapsed from the start of the first mode, and there is a sensor unit that satisfies the level switching condition but has not been subjected to termination processing (No in step S504), the procedure shifts to step S901 and the focus detection apparatus 700 operates in the first mode. If the predetermined time has elapsed from the start of the first mode, and there is no sensor unit that satisfies the level switching condition or there is a sensor unit that satisfies the level switching condition and has been subjected to the termination processing (Yes in step S504), the procedure shifts to step S511.

In step S901, the control unit 170 performs a level switching determination. If the termination processing has already been performed on the selected sensor unit (No in step S901), the procedure shifts to step S505. In this case, the result of the termination determination in step S505 is also "No", and a next sensor unit is selected in step S508. If the selected sensor unit has not been subjected to termination processing but has already been subjected to the level switching processing (No in step S901), the procedure also shifts to step S505. In this case, in step S505, the termination determination is performed. In the case where the selected sensor unit has not been subjected to either the termination processing or the level switching processing, the procedure shifts to step S902 if the selected sensor unit satisfies the level switching condition (Yes in step S901), and the procedure shifts to step S505 if the selected sensor unit does not satisfy the level switching condition (No in step S902). In the case of shifting to step S505, the selected sensor unit also does not satisfy the termination condition, and thus a next sensor unit will be selected in step S508. In step S902, the control unit 170 performs level switching processing, and switches the level of the reference signal that is supplied to the comparator 160 by the level switching unit 710 from "s_lvl" to "c_lvl". Then, in step S505, a termination determination is performed with respect to the currently selected sensor unit.

Figure 10:
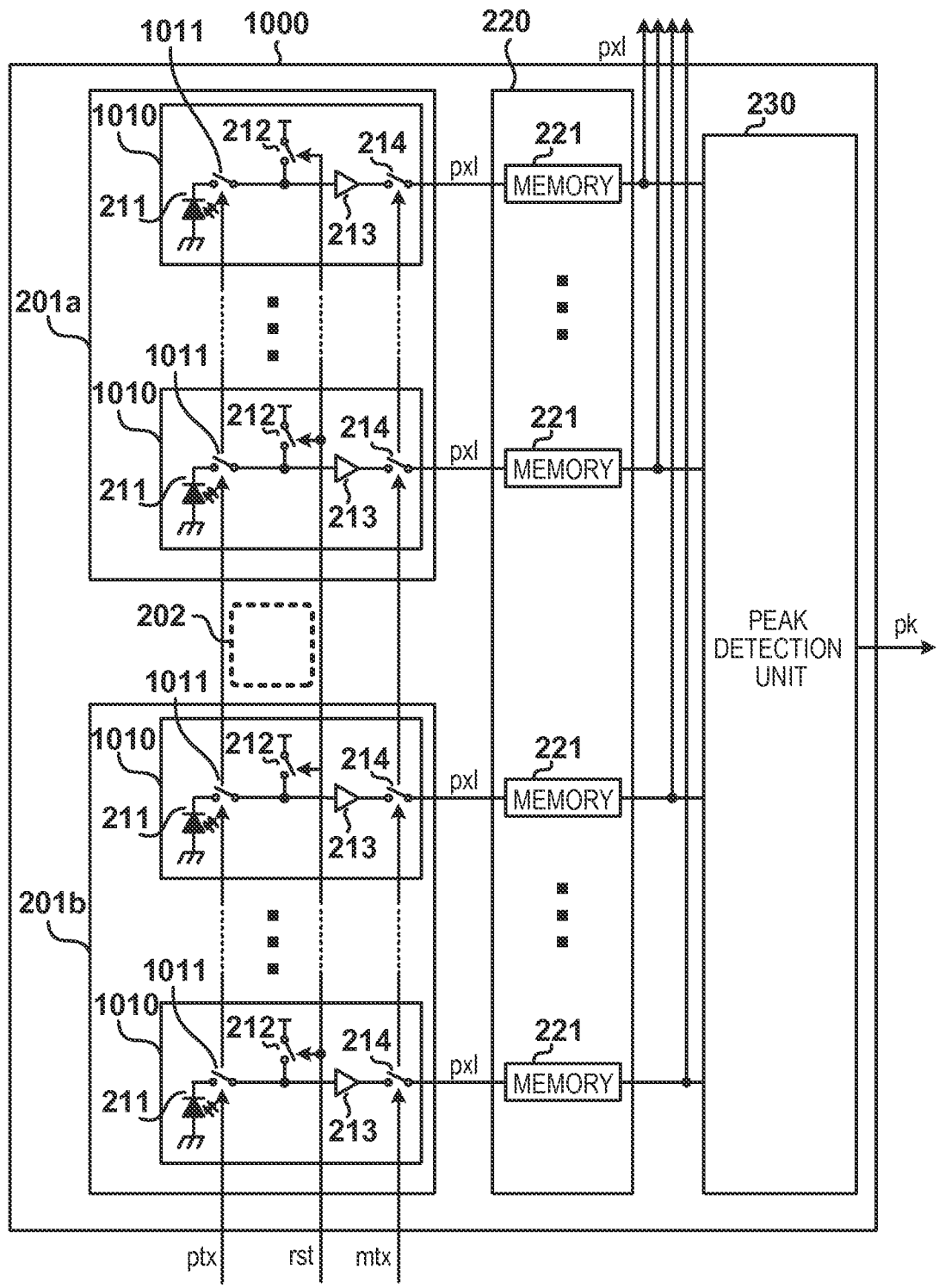
FIG. 10 is a block diagram illustrating an example of a configuration of a sensor unit according to some other embodiments of the present invention.

A focus detection apparatus according to a fourth embodiment is similar in configuration to the focus detection apparatus 100 according to the first embodiment, but is different from the focus detection apparatus 100 in that the sensor units 111, 112, 121 to 124, 131, and 132 are replaced by a sensor unit 1000 shown in FIG. 10. Each pixel 1010 of the sensor unit 1000 differs from the pixel 210 of the sensor unit 200 in that a switch 1011 is further provided. Each switch 1011 operates in accordance with a control signal "ptx" supplied from the control unit 170, and if the switch 1011 is in the conductive state (ON), the photodiode 211 and the amplifier 213 are electrically connected to each other. If the switch 1011 is in the non-conductive state (OFF), the photodiode 211 and the amplifier 213 are electrically disconnected from each other. If the switch 1011 is in the non-conductive state, it is possible to prevent noise that is generated in the photodiode 211 from being amplified by the amplifier 213 and accumulated. This makes it possible to reduce noise with respect to incident light that has a low luminance and needs to be accumulated for long time, and to improve the accuracy of focus detection.

Figure 11:
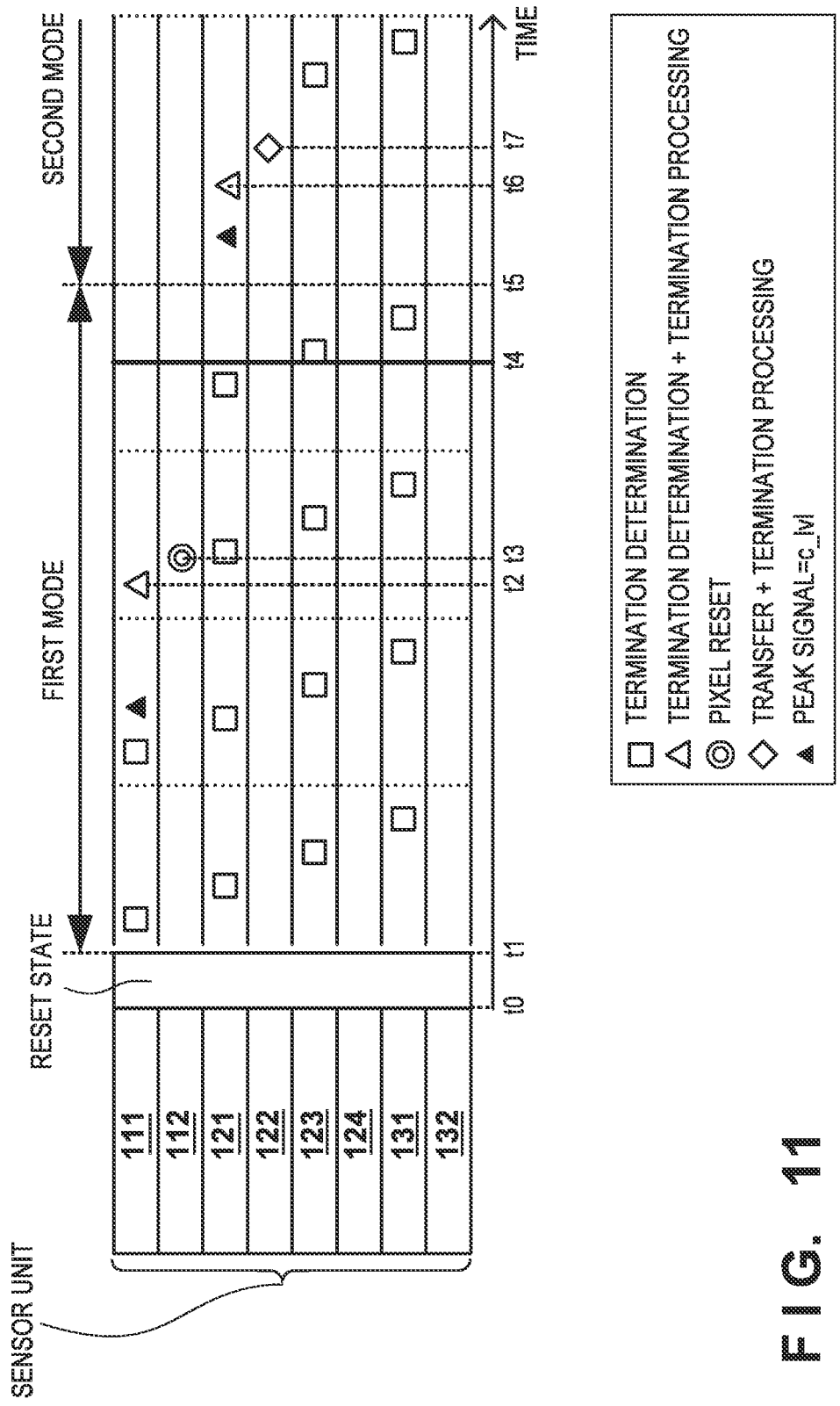
FIG. 11 is a diagram illustrating an outline of an example of operations according to some other embodiments of the present invention.

Next, an outline of an example of operations of the focus detection apparatus according to the present embodiment will be described with reference to FIG. 11. A horizontal axis in FIG. 11 denotes time, and FIG. 11 illustrates operations with respect to the sensor units at each point of time. Similar to the above-described embodiments, the focus detection apparatus of the present embodiment operates in the first mode after the start of charge accumulation, and then shifts to the second mode when a mode switching condition is satisfied. As the mode switching condition of the present embodiment, the mode switching condition of the first embodiment is used, but the mode switching condition in the second or third embodiment may be used.

In the present embodiment, different from all the above-described embodiments, the sensor units 111, 121, 123, and 131 are set as the determination targets in both the first and second modes, and the selection control unit 140 does not select other sensor units 112, 122, 124, and 132. Instead, the first mode differs from the second mode in that, if a selected sensor unit satisfies the termination condition, different processing is performed on a sensor unit that is arranged adjacent to this sensor unit.

At time "t0", the focus detection apparatus configures the initial settings similar to those of the first embodiment. In the present embodiment, the control unit 170 further sets the switches 1011 of the pixels of all the sensor units to the conductive state, as an initial setting. At time "t1", the control unit 170 switches the control signal "rst" that is supplied to the sensor units, and turns the switches 212 of the pixels 210 of all the sensor units to the non-conductive state (OFF). Also, the control unit 170 turns the switches 1011 of the pixels of the sensor units 112, 122, 124, and 132 that do not serve as the determination targets to the non-conductive state. The control unit 170 keeps the switches 1011 of the pixels of the sensor units 111, 121, 123, and 131 that serve as the determination targets in the conductive state. Accordingly, the amount of accumulated charges in each pixel 210 of the corresponding sensor units serving as the determination targets increases with elapsed time, according to light that is incident on the pixel 210, resulting in an increase in the pixel signal "pxl" that is output from the pixel 210. On the other hand, in the sensor unit that does not serve as the determination target, the charge is generated and accumulated in the photodiode 211, but the pixel signal does not change. Also, at time "t1", the control unit 170 sends the signal "start" to the selection control unit 140 and notifies the selection control unit 140 of the start of charge accumulation.

Similar to the first embodiment, after the start of charge accumulation, the focus detection apparatus sequentially selects a sensor unit from the sensor units serving as the determination targets in the first mode, and performs a termination determination with respect to each sensor unit. At time "t2", the sensor unit 111 satisfies the termination condition, and termination processing similar to that of the first embodiment is performed on the sensor unit 111. In the processing after that, no termination determination is performed on the sensor unit 111. If the sensor unit 111 satisfies the termination condition, the control unit 170 turns, at time "t3", the switches 212 of the pixels of the sensor unit 112 that is adjacent to the sensor unit 111 to the conductive state, and then turns the switches 1011 to the conductive state. With this, the charges accumulated in the photodiodes 211 are reset without being transferred to the amplifiers 213. Therefore, the focus detection unit 190 will perform focus detection with respect to the focus detection area 310 using only the pixel signals from the sensor unit 111.

At time "t4", the predetermined time has elapsed from the start of the first mode, and it is determined, at time "t5", that the mode switching condition is satisfied, the focus detection apparatus shifts to the second mode. At time "t6", the sensor unit 121 satisfies the termination condition, and the sensor unit 121 is subjected to termination processing similar to that of the first embodiment. In the processing after that, no termination determination is performed on the sensor unit 121. If the sensor unit 121 satisfies the termination condition, the control unit 170 switches, at time "t7", the switches 1011 of the pixels of the sensor unit 112 that is adjacent to the sensor unit 111 to the conductive state. Then, the charges accumulated in the photodiodes 211 are transferred to the amplifiers 213, and then the switches 214 are turned to the non-conductive state. Then, the control unit 170 turns the switches 212 to the conductive state, and resets the photodiodes 211. Therefore, the focus detection unit 190 will perform focus detection with respect to the focus detection area 320 using both the pixel signals from the sensor unit 121 and the pixel signals from the sensor unit 122. As described above, in the first mode, the focus detection apparatus of the present embodiment only perform reset processing without transferring the charges of the sensor unit 112, thereby accelerating the rate at which a cycle is completed. Also, in the second mode, the transfer processing of the sensor unit 122 is performed, and thus the pixel signals for use for focus detection can be obtained from the sensor unit 122. Accordingly, the accuracy of the focus detection performed by the focus detection apparatus is improved.

Figure 12:
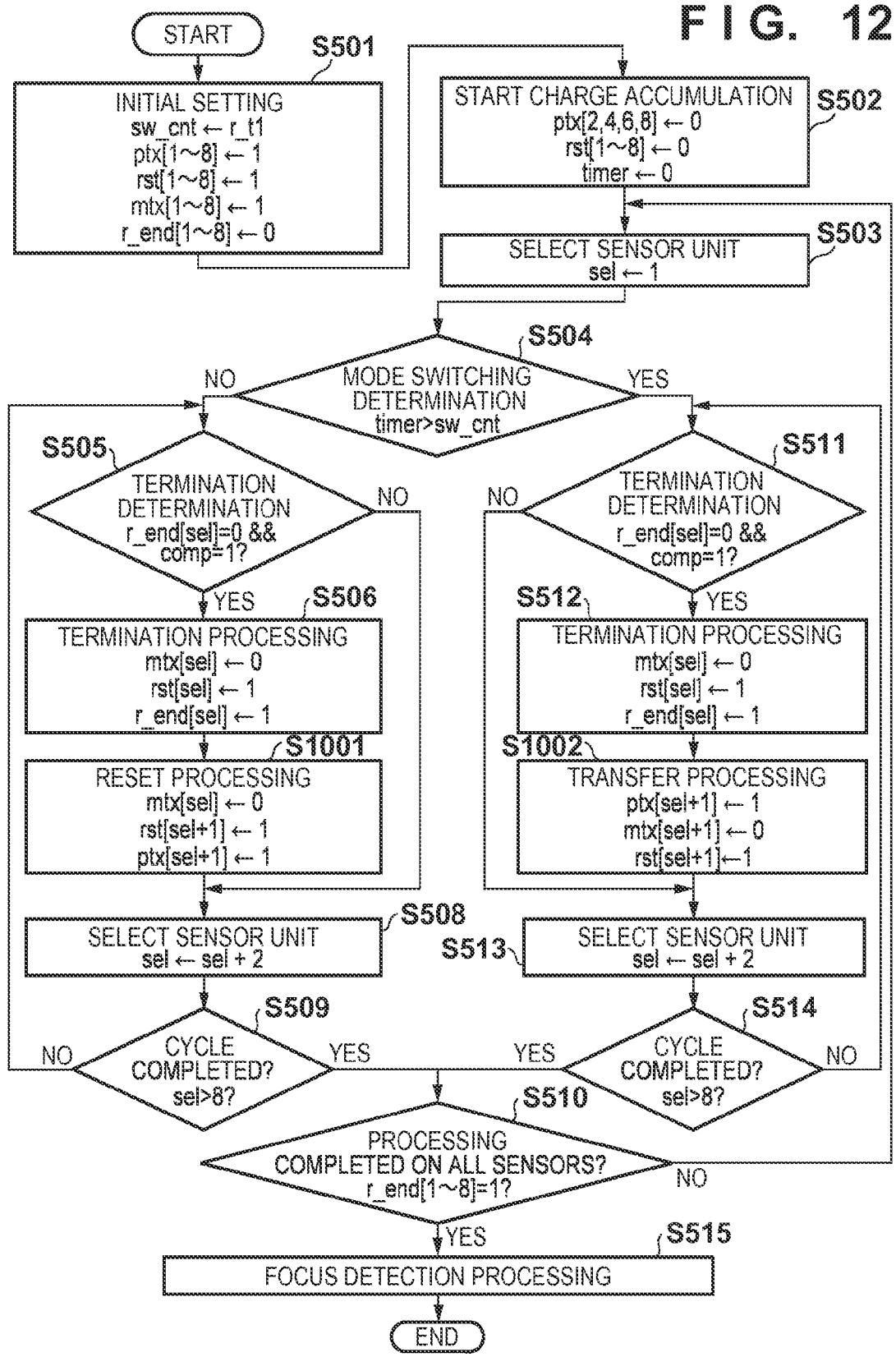
FIG. 12 is a flowchart illustrating detail of an example of operations according to some other embodiments of the present invention.

Next, an example of operations of the focus detection apparatus of the present embodiment will be described in detail with reference to the flowchart of FIG. 12. The same reference numerals are given to steps similar to the steps performed by the focus detection apparatus 100 of the first embodiment, and an overlapping description thereof is omitted. In the accumulating start processing in step S502, the control unit 170 simultaneously turns the switches 212 and the switches 1011 of the pixels of a sensor unit that does not serve as the determination target to the non-conductive state.

In the first mode, the control unit 170 performs, in step S506, termination processing on a sensor unit that is determined to satisfy the termination condition as described above, and then performs, in step S1001, reset processing on the sensor unit that is adjacent to this sensor unit. In this reset processing, the charges accumulated in the photodiodes 211 are not transferred.

In the second mode, the control unit 170 performs, in step S512, termination processing on the sensor unit that is determined to satisfy the termination condition as described above and performs, in step S1002, charge transfer processing on a sensor unit that is adjacent to this sensor unit. Specifically, when the control unit 170 turns the switches 1011 to the conductive state and the charges are completely transferred, the control unit 170 then turns the switches 214 to the non-conductive state and causes the memories 221 to hold the pixel signals. Then, the control unit 170 turns the switches 212 to the conductive state, and resets the photodiodes 211.

In the above-describe embodiments, focus detection is performed with respect to the three focus detection areas, but the number of the focus detection areas is not limited to this. For example, a plurality of sensor units may be arranged with respect to a single focus detection area, or one or more sensor units may be arranged with respect to each of focus detection areas. The present invention is applicable to a focus detection apparatus that is provided with a plurality of sensor units. In the above-described first to third embodiments, all the sensor units are targeted for determination in the second mode, but the present invention is not limited to this. The present invention is effective if the rate at which a cycle is completed on a group of pixels is faster in the first mode than in the second mode.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-207528, filed Sep. 20, 2012, which is hereby incorporated by reference herein in its entirety.

What is claimed is:

1. A focus detection apparatus for performing phase difference detection type focus detection, comprising:
a plurality of sensor units each including a plurality of pixels, each sensor unit being configured to generate a plurality of signals from the plurality of pixels to be used for detecting a phase difference;
a setting unit configured to set, from among the plurality of sensor units, one or more sensor units as determination targets, the setting unit including a control line to convey a selection signal for selecting a sensor unit from the determination targets that outputs a signal; and
a determination unit including a comparator configured to compare a peak value of the plurality of signals with a first threshold, the determination unit being configured to, using the comparator, determine repeatedly whether a signal generated by the sensor unit selected by the setting unit satisfies a termination condition at which the peak value is greater than the first threshold,
wherein the focus detection apparatus is configured to operate in a first mode and then shift to a second mode, and
the setting unit is configured to include, in the determination targets in the second mode, a sensor unit that is not included in the determination targets in the first mode, but not to include, in the determination targets in the second mode, a sensor unit whose peak value has been determined to be greater than the first threshold in the first mode.

2. The apparatus according to claim 1,
wherein the plurality of sensor units include a first sensor unit and a second sensor unit that are assigned to the same focus detection area, and the setting unit is configured to include, in the determination targets in the first mode, the first sensor unit but not the second sensor unit.

3. The apparatus according to claim 2,
wherein the first sensor unit and the second sensor unit are arranged adjacent to each other.

4. The apparatus according to claim 1,
wherein the focus detection apparatus is configured to continue to operate in the first mode until a predetermined time elapses from the start of the first mode.

5. The apparatus according to claim 1,
wherein the focus detection apparatus is configured to continue to operate in the first mode until any one of the sensor units serving as determination targets satisfies the termination condition.

6. The apparatus according to claim 1,
wherein the determination unit is further configured to determine whether a signal generated by the selected sensor unit satisfies a level switching condition of having a peak value that is greater than a second threshold that is smaller than the first threshold, and
the focus detection apparatus is configured to continue to operate in the first mode until a sensor unit, among the sensor units serving as determination targets of the first mode, that has been determined to satisfy the level switching condition during a period from when the first mode starts until when a predetermined time elapses subsequently satisfies the termination condition.

7. The apparatus according to claim 2,
wherein the setting unit is further configured not to include the second sensor unit in the determination targets in the second mode in a case where the peak value from the first sensor unit has been greater than the first threshold in the first mode.

8. The apparatus according to claim 2,
wherein the determination unit is further configured to determine in the first mode whether signals generated by the first and second sensor units satisfy the termination condition in a case where the peak value from the first sensor unit has been greater than the first threshold in the first mode.

9. The apparatus according to claim 2,
wherein the plurality of pixels included in each sensor unit is disposed in a predetermined pitch, and
the plurality of pixels included in the first sensor unit and the plurality of pixels included in the second sensor unit are disposed shifted by a half pitch.

10. The apparatus according to claim 1,
wherein the focus detection apparatus is configured to determine whether to shift from the first mode to the second mode each time the determination unit performs the determination of the plurality of sensor units.

11. The apparatus according to claim 1,
wherein the focus detection apparatus is configured to determine whether to shift from the first mode to the second mode each time the determination unit performs the determination of each sensor unit.

12. A focus detection apparatus for performing phase difference detection type focus detection, comprising:
a plurality of sensor units each including a plurality of pixels, each sensor unit being configured to generate a plurality of signals from the plurality of pixels to be used for detecting a phase difference;
a setting unit configured to set, from among the plurality of sensor units, one or more sensor units as determination targets, the setting unit including a selector configured to select one of a plurality of peak signals output from the plurality of sensor units and to output the selected peak signal; and
a determination unit including a comparator configured to compare a peak value of the plurality of signals with a first threshold, the determination unit being configured to, using the comparator, determine repeatedly whether a signal generated by the sensor unit selected by the setting unit satisfies a termination condition at which the peak value is greater than the first threshold,
wherein the focus detection apparatus is configured to operate in a first mode and then shift to a second mode, and
the setting unit is configured to include, in the determination targets in the second mode, a sensor unit that is not included in the determination targets in the first mode, but not to include, in the determination targets in the second mode, a sensor unit whose peak value has been determined to be greater than the first threshold in the first mode.

13. A focus detection apparatus for performing phase difference detection type focus detection, comprising:
a plurality of sensor units each including a plurality of pixels, each sensor unit being configured to generate a plurality of signals from the plurality of pixels to be used for detecting a phase difference;
a setting unit configured to set, from among the plurality of sensor units, one or more sensor units as determination targets, the setting unit including a control line to convey a selection signal for selecting a sensor unit from the determination targets that outputs a signal; and
a determination unit including a comparator configured to compare a peak value of the plurality of signals with a first threshold, the determination unit being configured to, using the comparator, determine repeatedly whether a signal generated by the sensor unit selected by the setting unit satisfies a termination condition at which the peak value is greater than the first threshold,
wherein the focus detection apparatus is configured to operate in a first mode and then shift to a second mode, and
the setting unit is configured to include, in the determination targets in the second mode, a sensor unit that is not included in the determination targets in the first mode and a sensor unit which is included in the determination targets in the first mode and whose peak value has not been determined to be greater than the first threshold in the first mode.

* * * * *